Patented Mar. 14, 1939

2,150,557

UNITED STATES PATENT OFFICE 2,150,557

METHOD OF PREPARING AMMONIUM SALTS OF SULPHATED PRIMARY ALCOHOLS

Clinton W. MacMullen, Philadelphia, Pa., assignor to Röhm & Haas Company, Philadelphia, Pa.

No Drawing. Application March 30, 1937,
Serial No. 133,827

8 Claims. (Cl. 260—457)

This invention relates to a method for the preparation of ammonium salts of sulphated primary alcohols. It relates more particularly to compounds of this class in which the sulphated alcohol contains an organic radical of such size and structure that the ammonium salts are capillary-active and thus can be used as wetting, dispersing and emulsifying agents.

Such compounds have been made in the past by treating an alcohol with a sulphating agent such as strong or fuming sulphuric acid, sulphur trioxide, chlorosulphonic acid, etc., and subsequently neutralizing the acid ester with ammonia. This method has certain disadvantages. During the sulphation of the alcohol it is necessary to keep the temperature rather low so as to avoid undesirable side reactions and even charring of the alcohol. It is not applicable to unsaturated alcohols nor to those which contain an easily sulphonatable group because the sulphating agent would react with these to give undesired by-products.

It is an object of this invention to provide a method for the preparation of the ammonium salts of any type of sulphated primary alcohol which eliminates the foregoing difficulties. It is a further object to provide a process for this purpose which can be carried out in a single step.

These objects are accomplished according to the present invention simply by heating together molecularly equivalent amounts of ammonium bisulphate and a neutral primary alcohol, preferably in the presence of an inert liquid, until one molecular equivalent of water has been eliminated. An excess of the ammonium bisulphate can be used if desired and this can be subsequently recovered simply by decanting or filtering the solution because the ammonium bisulphate is insoluble in the inert liquid.

The process is carried out in general by preparing the ammonium acid sulphate and treating this with the alcohol in the presence of an inert solvent such as toluene. The mixture is heated to boiling under a reflux condenser equipped with a water separater. The boiling toluene removes the water from the reaction mixture as rapidly as it is formed and the separator prevents its return to the reaction mixture. By measuring the amount of water separated it is possible to judge how rapidly and to what extent the reaction has proceeded and to stop it as soon as approximately the theoretical amount of water has been collected. The solution is then decanted from any of the unreacted ammonium acid sulphate and the product obtained by evaporating the solvent, preferably under reduced pressure.

The products obtained are usually in the form of pastes which when dissolved in water make excellent wetting, dispersing and emulsifying agents which are useful in the textile industry in washing and dyeing operations and for other purposes for which their capillary activity renders them suitable.

The process is applicable to a wide variety of primary alcohols which may be classified as follows:

1. Saturated primary aliphatic alcohols such as those containing from five to eighteen carbon atoms in a straight or branched chain, examples of which are amyl, isoamyl, hexyl, octyl, decyl, lauryl, cetyl, octadecyl, etc.

2. Unsaturated primary alcohols of the aliphatic series such as oleyl containing from five to eighteen carbon atoms in a straight or branched chain.

3. Alcohols containing more than one primary hydroxyl group or a secondary hydroxyl group in addition to the primary group such as decanediol-1,10, and alcohols obtained by hydrogenation of castor oil.

4. Primary aliphatic alcohols in which the carbon chain is interrupted by other atoms or groups such as —O—, —S—, —CO—, —CONH—, —COO—, etc., examples of which are the polyalkylene glycols; diethylene, triethylene, dipropylene glycol, etc.; alkoxy ethanols; keto alcohols: stearoylphenoxy ethanol; acid-amido alcohols: stearamidoethanol; mono esters of glycols: hydroxyethyl butyrate, etc., and thio-ether alcohols.

5. Aromatic alcohols: phenylethyl alcohol.

6. Hydroaromatic alcohols: cyclohexyl carbinol.

7. Aryloxy aliphatic alcohols: phenoxyethyl alcohol, $\alpha,\alpha,\gamma,\gamma$-tetramethylbutyl phenoxyethanol, butyl phenoxyethanol, phenoxyethoxyethanol, phenoxyethoxyethoxy ethanol and others of similar constitution having alkyl substituents in the aromatic nucleus. This last class of alcohols has the general formula:

$$R-O(C_2H_4O)_n-H$$

in which $n$ has a value of 1, 2 or 3, and R may be an alkyl, aryl, aralkyl, alkaryl or acyl radical.

The alcohols of all classes may have additional alcoholic hydroxyl groups of primary, secondary or tertiary nature. These alcohols must, however, be free of acid or basic groups.

The ammonium bisulphate may be prepared in any convenient manner, for example by fusing one mol of the normal sulphate with one mol of concentrated sulphuric acid.

The reaction between the ammonium bisulphate and the alcohol is preferably carried out in the presence of an inert solvent which is immiscible with water and boils at about 100° to 150° C. so that during refluxing it will carry out the water as fast as it is formed from the reaction. Such liquids are toluene, xylene, methyl cyclohexane, etc. It can also be carried out in the absence of the inert liquid but under these conditions it is more difficult to control the reaction.

The following examples will illustrate the invention, which, however, is not limited to the exact details of time, temperature and reactants given, as it may be otherwise practiced within the scope of the appended claims.

Example 1

A mixture of 200 cc. of toluene, 58 g. (0.5 mol) of ammonium bisulphate and 46.5 g. (0.25 mol) of lauryl alcohol was heated at 116° C. for five hours under a reflux condenser while stirring constantly. At the end of this time 4 cc. of water had separated and the hot toluene solution was decanted from the excess ammonium bisulphate. The solvent was then removed by distillation under reduced pressure leaving a grayish-white paste weighing 69 g.

Example 2

Ammonium bisulphate was prepared by fusing 33 g. of ammonium sulphate and 25 g. of 98% sulphuric acid (0.25 mol of each) in a flask until a clear homogeneous melt was obtained. To this was added 100 cc. of toluene which caused the ammonium bisulphate to crystallize and then 93 g. (0.5 mol) of lauryl alcohol dissolved in 100 cc. of toluene was added. This was stirred and refluxed for 14 hours at 120° C. after which time 7.3 cc. of water had separated. The solution foamed considerably and heating was discontinued. The hot solution was then decanted from a small amount of unreacted ammonium bisulphate and the toluene removed by distillation under reduced pressure. The residue which amounted to 120 g. was a white, pasty mass. The ammonium lauryl sulphate obtained according to this and the preceding example is a very good wetting agent in aqueous solutions when present in the amount of one to five grams per liter.

Example 3

A mixture of 200 cc. of toluene, 67.5 g. (0.25 mol) of n-octadecyl alcohol and 29 g. (0.25 mol) of ammonium bisulphate was refluxed for 14 hours at 116° C. 2.5 cc. of water separated. The solution was decanted and distilled as in the preceding examples. 78 g. of a brown, wax-like solid was obtained which was ammonium n-octadecyl sulphate.

Example 4

A mixture of 200 cc. of toluene, 67 g. of oleyl alcohol and 58 g. of ammonium bisulphate was refluxed for 9 hours at 115° C. 4.3 cc. of water separated and the residue obtained after separation of the excess ammonium bisulphate and the toluene weighed 66 g. It was a brown, waxy paste consisting of ammonium oleyl sulphate.

Example 5

A mixture of 200 cc. of toluene, 15 g. of ammonium bisulphate and 41 g. of stearamido ethanol was refluxed for 6½ hours at 111° C. One cubic centimeter of water separated. The product after removal of the solvent was a brown solid weighing 61 g.

Example 6

A mixture of 200 cc. of toluene, 29 g. of ammonium bisulphate and 63 g. of p-$\alpha,\alpha,\gamma,\gamma$-tetramethylbutylphenoxyethanol was heated for 11½ hours at 115° C. Three cubic centimeters of water separated and after removal of the solvent 81 g. of $\alpha,\alpha,\gamma,\gamma$-tetramethylbutylphenoxy ethyl ammonium sulphate was obtained in the form of a white gelatinous paste.

Example 7

A mixture of 200 cc. of toluene, 12.6 g. of ammonium bisulphate, and 29.4 g. of p-$\alpha,\alpha,\gamma,\gamma$-tetramethylbutylphenoxy ethoxy ethanol was heated for 16½ hours at 112° C. One cubic centimeter of water separated, and, after filtration and the removal of the solvent, there remained 39 g. of a brown paste.

Example 8

A mixture of 200 cc. of toluene, 12.6 g. of ammonium bisulphate, and 33.8 g. of p-$\alpha,\alpha,\gamma,\gamma$-tetramethylbutylphenoxy ethoxy ethoxy ethanol was heated for 14 hours at 113° C. 1.5 cubic centimeters of water separated and, after filtering and removing the solvent, there remained 38 g. of a light brown paste.

The nature of the radical attached to the —$CH_2OH$ group of the alcohol affects the ease with which it reacts with the ammonium bisulphate. The long chain primary alkyl alcohols are rather sluggish. Those containing an ether oxygen atom are much more active, particularly when this atom is attached to the $\beta$ carbon atom of the alcohol.

The ammonium alkyl sulphates prepared from neutral, primary, monohydric alcohols containing from eight to eighteen carbon atoms are all soluble in water and are strong wetting, dispersing and cleansing agents. The corresponding ammonium sulphates made from other types of alcohol are also strong wetting, cleansing and dispersing agents when the organic chain of the alcohol is of sufficient length.

I claim:

1. The process of preparing ammonium $\alpha,\alpha,\gamma,\gamma$-tetramethylbutylphenoxy ethyl sulphate which comprises heating ammonium bisulfate with $\alpha,\alpha,\gamma,\gamma$-tetramethylbutylphenoxy ethanol at about 100° C. so as to split out water.

2. The process of preparing an ammonium salt of the general formula

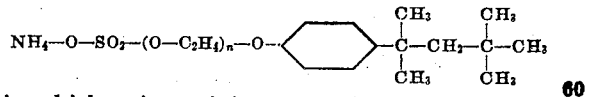

in which $n$ is an integer less than four, which comprises heating ammonium bisulphate with an alcohol of the formula

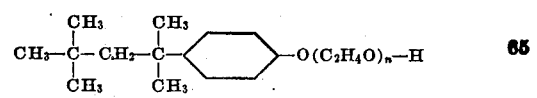

at about 100° C. so as to split out water.

3. The process of preparing an ammonium salt of the general formula

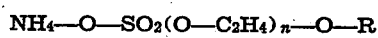

in which $n$ is an integer less than four and R is a hydrocarbon radical, which comprises heating ammonium bisulphate with an alcohol of the general formula $R-O-(C_2H_4O)_n-H$ at a temperature of from about 100 to about 150° C. to split out water.

4. The process for the preparation of the ammonium salt of a sulphuric acid ester of an alcohol which comprises heating ammonium bisulphate with a neutral, monohydric, primary alcohol at a temperature of from about 100 to about 150° C. to split out water.

5. A process for the preparation of the ammonium salt of a sulphuric acid ester of an alcohol which comprises heating ammonium bisulphate with a neutral organic compound containing at least one primary alcoholic hydroxyl group in the presence of an inert solvent at about the boiling point of the solvent so as to split out water.

6. The process for the preparation of an ammonium salt of a sulphuric acid ester of an alcohol which comprises heating ammonium bisulphate with a neutral, monohydric, primary alcohol containing eight to eighteen carbon atoms at a temperature of from about 100 to about 150° C. to split out water.

7. The process for the preparation of the ammonium salt of a sulphuric acid ester of an alcohol which comprises heating ammonium bisulphate with a neutral organic compound, containing at least one primary alcoholic hydroxyl group, in the presence of an inert solvent having a boiling point of from about 100° to about 150° C. at the boiling point of the solvent so as to split out water.

8. The process for the preparation of the ammonium salt of a sulphuric acid ester of an alcohol which comprises heating an ammonium bisulphate with a neutral organic compound, containing at least one primary alcoholic hydroxyl group, in the presence of an inert solvent immiscible with water and having a boiling point of from about 100° C. to about 150° C. at the boiling point of the solvent so as to split out water.

CLINTON W. MacMULLEN.